Feb. 5, 1957 A. ARNTZEN 2,780,022
FISH LURES
Filed May 9, 1955
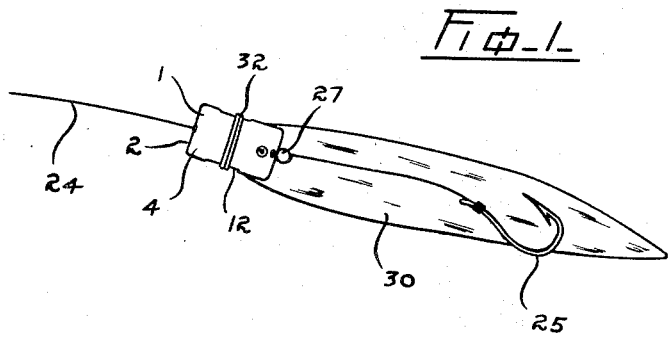
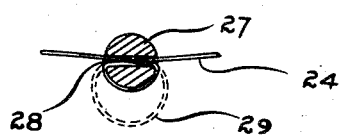
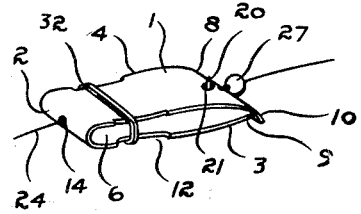
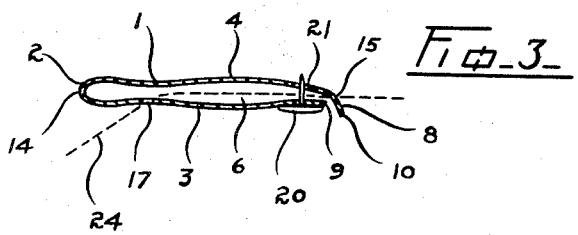
INVENTOR
ARNT ARNTZEN
ATTORNEY

United States Patent Office 2,780,022
Patented Feb. 5, 1957

2,780,022
FISH LURES

Arnt Arntzen, North Burnaby, British Columbia, Canada

Application May 9, 1955, Serial No. 506,723

2 Claims. (Cl. 43—42.36)

My invention relates to improvements in fish lures. The objects of the invention are to provide a simple effective lure capable of supporting and securing a herring strip or so-called live bait to the leader of a fishing line, so that the hook is trailed alongside the bait rather than behind it, and to provide means whereby the lure and its bait may be caused to move from side to side in an irregular manner when being drawn through the water.

Referring to the accompanying drawings:

Figure 1 is an elevational view of the invention.

Figure 2 is a perspective view of the bait holder.

Figure 3 is an enlarged longitudinal view of the holder, shown in section.

Figure 4 is an enlarged transverse sectional view of the adjustable bead.

In the drawings like characters of reference indicate corresponding parts in each figure.

The numeral 1 indicates generally a holder formed of a strip of sheet material, preferably a thin flexible plastic, which strip is folded intermediate its length to provide a semi-circular fold 2, a short side 3, and a long side 4, the said sides defining a space 6. The free end 8 of the long side is downwardly turned as shown particularly in Figure 3 and is normally engaged by the free end 9 of the short side and said sides together form a grip indicated by the numeral 10. The sides 3 and 4 are preferably notched along their edges as at 12.

A centrally disposed aperture 14 is provided in the fold 2 of the strip and an aperture 15 is similarly located in the free end 8. The short side 3 is provided adjacent the fold 2 with an aperture 17 which may be located along the longitudinal axis of the holder or spaced transversely therefrom.

Secured to the free end 9 of the short side is a spike 20 which normally projects across the space 6 and through an aperture 21 formed in the side 4.

The holder is adapted to be attached to a nylon leader 24 which connects the hook 25 to the fishing line, not shown. In order to provide means for adjusting the holder lengthwise of the leader, said leader is fitted with a bead 27 having a central bore 28 through which the leader passes twice to form a bight 29 which encircles one-half of the bead, as shown part in Figure 4. The leader is normally threaded through the apertures 14 and 15 so that the bead 27 abuts the free end 8 of the long side. With the leader in this position the holder is drawn through the water substantially without sidewise movement, however, the leader may be threaded through the apertures 15 and 17 as shown in dotted line in Figure 3. In this position when being drawn through the water the planing effect of the forepart of the holder causes it to move from one side of its line of travel to the other, so as to somewhat simulate the action of a fish.

When baiting the lure, the sides 3 and 4 are forced apart and a strip of bait 30, which may be a herring strip as in Figure 1, is inserted therebetween and the sides released, so that the bait is impaled upon the spike 20 and is held by the grip 10. If necessary, one or more elastic bands 32 are wrapped around the lure and are lodged in the notches 12, so as to increase the holding power of the grip 10. The bead 27 is then adjusted along the leader by slipping the bight 29 and subsequently tightening it in a position which will leave the hook 25 somewhere within the trailing length of bait as shown in Figure 1. The bait thus secured is not likely to be accidentally lost and when removed or damaged by a striking fish is easily replaced by another herring strip.

What I claim as my invention is:

1. A fish lure comprising a holder formed of a strip of thin resilient material folded intermediate its length to provide coacting sides, said sides defining a space adapted to receive one end of a length of bait, the free ends of said sides forming a resilient grip, said holder being adapted for attachment to a line and having an aperture adjacent each end thereof through which said line is adapted to extend substantially along its longitudinal axis, one side of said holder having a third aperture intermediate its length through which end one aperture adjacent the resilient grip the line may extend whereby to cause a planing effect of the holder when being drawn through the water by the line.

2. A fish lure as claimed in claim 1, wherein the third aperture is disposed to one side of the longitudinal axis of the holder.

References Cited in the file of this patent

UNITED STATES PATENTS

| 319,359 | Van Gieson | June 2, 1885 |
| 1,489,156 | Russell | Apr. 1, 1924 |
| 1,854,027 | Gruenhagen | Apr. 12, 1932 |
| 2,509,704 | Streitwieser | May 30, 1950 |

FOREIGN PATENTS

| 8,409 | Great Britain | 1908 |
| 23,132 | Great Britain | 1894 |